Oct. 16, 1951
K. ENSLEIN
2,571,431
PHASE INVERTER CIRCUIT
Filed Sept. 8, 1950
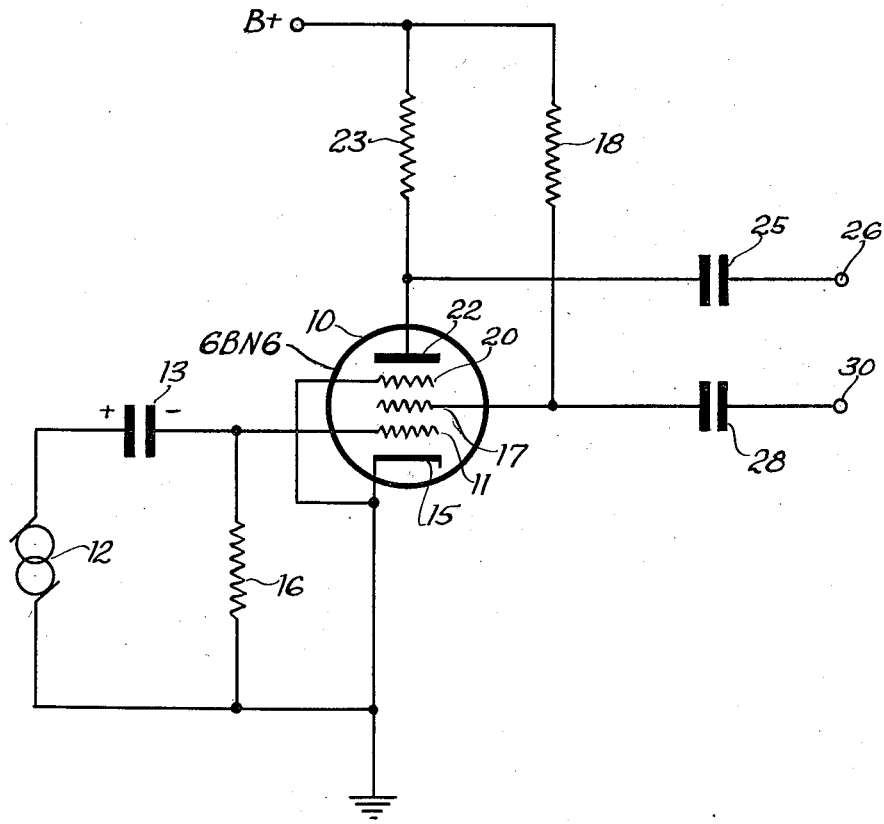
INVENTOR.
Kurt Enslein
BY J. L. Bowes
ATTORNEY Patented Oct. 16, 1951

2,571,431

UNITED STATES PATENT OFFICE 2,571,431

PHASE INVERTER CIRCUIT

Kurt Enslein, Rochester, N. Y., assignor to Stromberg-Carlson Company, a corporation of New York Application September 8, 1950, Serial No. 183,763

7 Claims. (Cl. 321—56)

The present invention relates to electrical circuits, and, more particularly, to electrical circuits for producing two voltages of opposite phase from a single phase source. Such circuits are commonly called phase splitters, and are useful in a wide variety of applications wherein voltages of opposite phase are required from a single phase source.

Certain arrangements heretofore proposed have employed a vacuum tube circuit having substantially equal cathode and anode load impedances to derive two voltages of opposite phase from a single phase source which is connected to the control electrode of the tube. In all such single tube prior art arrangements, the two output voltages of opposite phase are only obtainable at the expense of amplification due to the degenerative connections of the cathode resistor, and, in fact, the output voltages from the conventional phase inverter are of smaller amplitude than the input voltage. While certain other arrangements heretofore proposed provide two out-of-phase voltages in amplified form from a single phase source, these arrangements require several tubes and relatively complicated circuitry and are not satisfactory from the cost standpoint in the mass production of such items as radio and television receivers.

Accordingly, it is a primary object of the present invention to provide a new and improved phase inverter circuit.

It is another object of the present invention to provide a new and improved phase inverter circuit which operates from a single phase source and in which two voltages of opposite phase and of amplified form are obtained with a single tube.

It is still another object of the present invention to provide a new and improved single tube phase inverter circuit in which two amplified voltages of opposite phase may be obtained from a single phase source.

It is a further object of the present invention to provide a new and improved single tube phase inverter circuit in which two amplified voltages of opposite phase may be obtained from a single phase source and wherein means are provided for equalizing the amplitudes of the out-of-phase voltages produced thereby.

It is a still further object of the present invention to provide a new and improved phase inverter circuit wherein a vacuum tube provided with an input electrode having a positive transconductance relative to a first output electrode and having a negative transconductance relative to a second output electrode is employed to provide amplified out-of-phase voltages from a single phase source.

The invention, both as to its organization and method of operation, together with further objects and advantages thereof, will best be understood by reference to the following specification taken in connection with the accompanying drawing, in which the single figure is a schematic diagram of a phase inverter constructed in accordance with the principles of the present invention.

Referring now more particularly to the drawing, the phase inverter circuit of the present invention is there illustrated as comprising a vacuum tube 10, the control electrode 11 of which is supplied with an alternating voltage from a suitable source such as the generator 12 through the coupling condenser 13.

The tube 10 is preferably of the so-called gated beam type in which a sharply focused electron beam passes through two control grids, each of which has an unusually steep and linear transfer characteristic. For example, the tube 10 may comprise a gated beam tube of the 6BN6 commercial type. The tube 10 is provided with a cathode 15 which is connected to ground potential, a control electrode 11 which is connected through the grid leak resistor 16 to ground potential, an accelerator electrode 17 which is connected through the load resistor 18 to a unidirectional source of potential indicated by the reference character B+, a second control electrode 20 which is illustrated in the drawing as being connected to the cathode 15, and an anode 22 which is connected through a load resistor 23 to the B+ supply. Output voltage derived from the anode 22 is coupled through the condenser 25 to a first output terminal 26. Also, voltage of opposite phase which is derived at the accelerator electrode 17 in a manner described in more detail hereinafter, is coupled through the condenser 28 to a second output terminal 30. The tube 10 is also provided with focus, lens and shield electrodes (not shown schematically in the drawing) which are internally connected to the cathode to provide a sharply focused electron beam. Due to the fact that the total cathode current of the tube 10 is limited to a maximum value by the shaped electron beam, the total cathode current remains constant despite the voltages applied to the control electrode 11. Accordingly, when the plate current increases, the accelerator current decreases, the relative increase and decrease of these currents being determined by the respective transconductances of the control grid to each of these output electrodes. It is thus seen that the control grid 11 possesses a high positive transconductance with respect to the anode 22, and the control grid 11 possesses a somewhat smaller negative transconductance with respect to the accelerator electrode 17.

In considering the operation of the above-described phase inverter circuit, the alternating input voltage supplied by the generator 12 is applied through the condenser 13 to the control electrode 11 of the gated beam tube 10. Inasmuch as the tube 10 is operated, under static conditions, at zero bias, the condenser 13 is charged through the control electrode-cathode path of the tube 10 during the positive portions of the input wave so as to acquire a charge of the polarity shown in the drawing. The control electrode 11 is thus biased negatively in proportion to the amplitude of the incoming wave so that a faithful reproduction of the input wave is provided in the output circuits of the tube 10.

The input wave supplied to the control electrode 11 of the tube 10 is repeated in amplified form and of opposite polarity across the anode load resistor 23 and is coupled through the condenser 25 to the output terminal 26. There is thus produced at the output terminal 26 an amplified voltage which is similar in wave shape to the input voltage but which is of the opposite phase. Due to the fact that the control grid 11 possesses a negative transconductance with respect to the accelerator electrode 17, the voltage produced across accelerator load resistor 18 is in the same phase as the input voltage, and this voltage is coupled through the condenser 28 to the output terminal 30. There is thus produced at the output terminals 26 and 30 amplified voltages which are of opposite phase and have a wave shape substantially similar to that of the input wave supplied from the generator 12.

In order to provide equal amplitude output voltages of opposite phase at the terminals 26 and 30, the values of the load resistors 23 and 18 are so chosen that the product of the load resistor 23 and the control-grid-to-anode transconductance is equal to the product of the accelerator load resistor 18 and the control-grid-to-accelerator transconductance. With this arrangement, the voltages produced at the output terminals 26 and 30 are not only of opposite phase and of amplified form, but in addition are of equal amplitude.

In the event that it is desired to derive output voltages of maximum amplitude from the tube 10, the control-grid-to-accelerator transconductance, which is inherently smaller than the control - electrode - to - anode transconductance, may be increased by operating the second control electrode 20 at a fixed small potential which is positive with respect to the potential of the cathode 15. For example, the second control electrode 20 may be operated at a potential from two to five volts positive with respect to the cathode.

While the present invention has been described in connection with a gated beam tube 10 of the 6BN6 commercial type, it will be evident that any suitable tube may be employed having a control grid and two output electrodes, the control grid having a positive transconductance relative to one of the output electrodes and having a negative transconductance relative to the other output electrode.

From the foregoing, it is seen that the present invention provides a phase inverter circuit wherein two out-of-phase voltages may be derived from a single phase source with substantial amplification in a single tube and with a minimum of circuit cost and complexity. Also, the amplitudes of the amplified out-of-phase voltages may be equalized to accommodate situations in which equal amplitude out-of-phase voltages are required.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. A phase inverter circuit, comprising a vacuum tube including a pair of output electrodes and a pair of input electrodes, one of said input electrodes having a positive transconductance relative to a first of said output electrodes and having a negative transconductance relative to a second of said output electrodes, a single phase input voltage source coupled to said input electrodes, and means for deriving from said output electrodes amplified output voltages of opposite phase.

2. A phase inverter circuit, comprising an electron discharge device having a cathode, a control electrode and first and second output electrodes, said control electrode having a negative transconductance relative to said first output electrode and having a positive transconductance relative to said second output electrode, means for applying a voltage between said control electrode and said cathode, means for deriving from said first output electrode said voltage in amplified form and of like phase, and means for deriving from said second output electrode said voltage in amplified form and of opposite phase.

3. Apparatus for obtaining voltages of opposite phase from a single phase source, comprising an electron discharge device having a pair of input electrodes and first and second output electrodes, one of said input electrodes having a negative transconductance relative to said first output electrode and having a positive transconductance relative to said second output electrode, means for supplying an input voltage from said source to said input electrodes, means for deriving from said first output electrode said input voltage in amplified form and of like phase, and means for deriving from said second output electrode said input voltage in amplified form and of opposite phase.

4. Apparatus for obtaining voltages of equal amplitude and opposite phase from a single phase source, comprising an electron discharge device having a cathode, a control electrode and first and second output electrodes, said control electrode having a negative transconductance relative to said first output electrode and having a positive transconductance relative to said second output electrode, load impedances associated with each of said output electrodes, the products of the load impedance and transconductance of each of said output electrodes being equal, means for applying an input voltage from said source between said control electrode and said cathode, means for deriving from said first output electrode said input voltage in amplified form and of like phase, and means for deriving from said second output electrode said input voltage in amplified form and of opposite phase.

5. A phase inverter circuit, comprising an electron discharge device having at least a cathode, an anode, first and second control electrodes and an accelerator electrode, said first control electrode having a negative transconductance relative to said accelerator electrode and having a positive transconductance relative to said anode, means for operating said second control electrode at a small fixed positive potential relative to said cathode, means for applying an input voltage between said control electrode and said cathode, means for deriving from said anode said input voltage in amplified form and of opposite phase, and means for deriving from said accelerator electrode said input voltage in amplified form and of like phase.

6. A phase inverter circuit, comprising an electron discharge device having at least a cathode, an anode, a first control electrode, an accelerator electrode, and a second control electrode positioned between said accelerator electrode and said anode, said first control electrode having a negative transconductance relative to said accelerator electrode and having a positive transconductance relative to said anode, means for operating said second control electrode at a small fixed positive potential relative to said cathode, means for applying an input voltage between said control electrode and said cathode, means for deriving from said anode said input voltage in amplified form and of opposite phase, and means for deriving from said accelerator electrode said input voltage in amplified form and of like phase.

7. A phase inverter circuit, comprising an electron discharge device having at least a cathode, a control electrode and first and second output electrodes, said control electrode having a negative transconductance relative to said first output electrode and having a positive transconductance relative to said second output electrode, means for applying an input voltage between said control electrode and said cathode, means including a first load impedance for deriving from said first electrode said input voltage in amplified form and of like phase, and means including a second load impedance for deriving from said second output electrode said input voltage in amplified form and of opposite phase, the product of said first impedance and said positive transconductance being equal to the product of said second impedance and said negative transconductance whereby said derived voltages are of equal amplitude.

KURT ENSLEIN.

REFERENCES CITED

The following references are of record in the file of this patent:

UNITED STATES PATENTS

| Number | Name | Date |
|---|---|---|
| 1,763,309 | Hough | June 10, 1930 |
| 2,428,264 | Crosby | Sept. 30, 1947 |

OTHER REFERENCES

Publication: FM—TV, March 1950, "TV Applications of the 6BN6," pages 14, 15 and 30.